United States Patent [19]

Yoshikawa et al.

[11] 4,127,503

[45] Nov. 28, 1978

[54] OXYGEN ABSORBENT

[75] Inventors: Yoshio Yoshikawa, Ushiku; Akira Amemiya; Toshio Komatsu, both of Tokyo; Yoshiaki Inoue, Iizuka; Megumu Yuyama, Tokyo, all of Japan

[73] Assignee: Mitsubishi Gas Chemical Company, Inc, Tokyo, Japan

[21] Appl. No.: 816,134

[22] Filed: Jul. 15, 1977

[30] Foreign Application Priority Data

Jul. 15, 1976 [JP] Japan .................................. 51-84169

[51] Int. Cl.$^2$ ........................ B01J 31/02; B01J 27/14; B01J 27/02; B01J 27/06
[52] U.S. Cl. ................................ 252/429 R; 252/437; 252/439; 252/440; 252/441

[58] Field of Search ................... 252/441, 429 R, 437, 252/439, 440

[56] References Cited

U.S. PATENT DOCUMENTS 2,825,651   3/1958   Loo et al. ............................... 99/171

FOREIGN PATENT DOCUMENTS 4,719,729   1972   Japan.
553,991     1943   United Kingdom.

Primary Examiner—Patrick P. Garvin
Assistant Examiner—William G. Wright
Attorney, Agent, or Firm—Flynn & Frishauf

[57] ABSTRACT

An oxygen absorbent comprising a metal powder and a metal halide coated thereon is disclosed.

54 Claims, No Drawings

OXYGEN ABSORBENT

BACKGROUND OF THE INVENTION

This invention relates to an oxygen absorbent comprising a metal powder coated with a definite amount of a metal halide and having a minor amount of water.

In order to preserve foodstuffs, such as vegetables, fish, shellfish, meats, processed foodstuffs, such as potato chips, cakes, peanuts, etc., and so on, it is necessary to prevent the foodstuffs from getting moldy and from putrefying. Prior art methods have used freezer storage, cold storage, vacuum packaging and replacing the gas present in the inner part of packaging by an inert gas for preventing foodstuffs from getting moldy and putrefying. Additives, such as antioxidant, have been used for preserving foodstuffs. Recently, governments have started to regulate the use of additives for food, since it is realized that some additives are injurious to humans. The freezer storage method requires large-scale apparatus and complicated operation, so the freezer storage method is costly.

Molds or eumycetes, bacterias and higher organisms such as insects tend to disturb preservation of foodstuffs. These mold eumycetes, bacterias and insects live and grow in the presence of oxygen and cause putrefaction and change in quality of foodstuffs.

Therefore, if oxygen can be selectively removed from the atmosphere in which the foodstuffs are packed, the problem of putrefaction and change in quality of foodstuff can be overcome, and it will become possible to preserve foodstuffs for a long time.

Attempts have been made for producing such an oxygen absorbent.

Japanese patent publication No. 19729/1972 discloses the use of an oxygen absorbent comprising hydrosulfite, calcium hydroxide, sodium bicarbonate, activated carbon and optionally water to preserve vegetables by removing oxygen from atmosphere.

U.S. Pat. No. 2,825,651 proposes a process for preparing an oxygen absorbent comprising mixing a finely divided sulfite and a finely divided metal salt, at least one of the two compounds having water of crystallization and compression-pelletizing the mixture in order to increase the rate of the oxidation of sulfite.

British Pat. No. 553,991 discloses the step of forming pilule comprising carbon and highly activated iron powder obtained by hydrogen treatment followed by absorbing oxygen in a hood using the resulting pilule. Since iron powder contained in the pilule is highly active, the iron intensely reacts with oxygen in the container to remove oxygen therein. There is the possibility of fire in case of using such highly active iron powder. The process of British Pat. No. 5553991 is dangerous.

SUMMARY OF THE INVENTION

The present inventors have carried out wide researches on an oxygen absorbent having the following properties:
(a) having no risk from hydrogen-evolution,
(b) being capable of being packed by automatic packaging machine,
(c) being free-flowing,
(d) and, maintaining the effectiveness of the effective component contained therein, even when the absorbent is allowed to stand in air before being sealed with foodstuffs.

Foodstuffs contain a considerable amount of water, and when a foodstuff is placed in a sealed container, it was found that moisture fills the container to nearly saturated humidity at the temperature. It was also found that when a dry mixture of a metal powder and a metal halide is sealed with water-containing foodstuffs in a container, the oxygen concentration in the container gradually lowers until at last the concentration is zero.

The present inventors also found that when a mixture of a metal powder and a metal halide is used, a large amount of the metal halide is required for rapidly absorbing oxygen but that when the metal halide is coated on the metal powder, a small amount of the metal halide is effective for rapidly absorbing oxygen. In other words, it was found that an oxygen absorbent powder in which a small amount of the metal halide is coated on the surface of metal powder and which has a minor water content rapidly absorbs oxygen in a sealed container, when it coexists with foodstuffs.

It was found that since the oxygen absorbent has free flowability and minor water content, it has the following advantages:
(a) Since it absorbs oxygen while taking a small amount of water from the foodstuffs, little of the water contained in the oxygen absorbent migrates into the foodstuffs contrary to the prior art oxygen absorbent,
(b) It does not become wet and pasty, and
(c) It does not penetrates through the packaging material into the foodstuff.

It was also found that little hydrogen is evoluted.

The present inventors further found that an oxygen absorbent obtained by coating a metal halide and a binder and/or an alkaline material on the surface of a metal powder has an excellent ability to absorb oxygen and generates little hydrogen.

This invention is formed on the basis of this discovery.

Therefore, an object of this invention is to provide an oxygen absorbent overcoming the prior art disadvantages, namely non-flowability, dangerousness and wettability.

This invention relates to an oxygen absorbent in which at least one metal halide is coated on the surface of at least one metal powder, the amount of metal halide coated being in the range of from about 0.001 part to about 10 parts by weight on the basis of 100 parts by weight of the metal powder, and the water content of the absorbent being less than 1% by weight on the basis of the total weight of the absorbent; and this invention also relates to an oxygen absorbent in which at least one metal halide and at least one binder and/or at least one alkaline material is coated on the surface of at least one metal powder, the amount of metal halide coated being in the range of from about 0.001 part to about 10 parts by weight on the basis of 100 parts by weight of the metal powder, and the water content of the absorbent being less than 1% by weight on the basis of the total weight of the absorbent.

This invention further relates to a process for producing an oxygen absorbent which comprises mixing at least one metal powder with a solution of at least one metal halide to coat 0.001 part to 10 parts by weight of the metal halide on 100 parts by weight of the metal powder, and drying the coating material until the water content thereof amounts to less than 1% by weight of the total weight of the absorbent; and this invention relates to a process for producing an oxygen absorbent which comprises mixing at least one metal powder with at least one metal halide solution and at least one binder and/or at least one alkaline material to coat 0.001 part to 10 parts by weight of the metal halide and the binder and/or the alkaline material on 100 parts of the metal powder, and drying the coating material until the water content thereof amounts to less than 1% by weight based on the total weight of the absorbent.

DETAILED DESCRIPTION OF THE INVENTION

The term "oxygen absorbent" in the specification and the claim means an agent for removing oxygen.

The metal powders which can be employed in the present invention may include copper powder, iron powder, zinc powder, and mixtures thereof; iron powder is preferred. Suitably the metal powder has size of less than 10 mesh, preferably 50 mesh. The metal powders may be electrolyic metal powders reduced metal powders atomized metal powders and stamped metal powders. Reduced iron powder, electrolytic iron powder and spraying iron powder are preferred. The metal does not need to have high purity. The metal may contain impurities, as long as the object of this invention can be achieved. The mesh screen employed was Tyler Standard Sieve.

The metals constituting the metal halides may be metals selected from the group consisting of alkali metals, alkali earth metals, copper, zinc, aluminum, tin, manganese, iron, cobalt and nickel. In order to avoid the generation of hydrogen, alkali metals, such as lithium, sodium, potassium and alkali earth metals, such as calcium, magnesium and barium are preferred. The halogen constituting the metal halide may be chlorine, bromine or iodine. Chlorine is preferred.

The amount of the metal halide to be coated on the surface of the metal powder is in the range of from about 0.001 part to about 10 parts by weight per 100 parts by weight of metal powder, and about 0.01 part to about 5 parts of the metal halide is preferred. When the amount of the metal halide coated is less than 0.001 part by weight, the absorbing ability of oxygen is lowered. When the amount of the metal halide coated is more than 10 parts by weight, much water is likely to be migrated into the oxygen absorbent due to deliquescence of the metal halide. Therefore, the metal halide penetrates through the packaging material into foodstuff and the evolution of hydrogen increases.

Suitably, the binders may include water soluble polymeric compounds, such as sodium alginate, carboxymethyl cellulose (CMC), hydroxymethyl cellulose, methyl cellulose, ethyl cellulose, propyl cellulose, sodium carboxymethyl cellulose, starch, polyhydric alcohols, polyvinyl alcohol (PVA), saccharides, tragacanth gum. The amount of the binder employed may be in the range of from about 0.01 part to 10 parts by weight per 100 parts by weight of the metal powder, and about 0.1 to about 2 parts by weight of the binder is preferably employed.

The alkaline materials may include hydroxides, carbonates, sulfites, thiosulfates, dibasic phosphates, tribasic phosphates, polyphosphates, tri-polyphosphates, or organic acid salts of alkali metals or alkali earth metals. Sodium hydroxide, sodium carbonate sodium sulfite, sodium thiosulfate, tribasic sodium phosphate, dibasic sodium phosphate, potassium hydroxide, potassium carbonate, potassium sulfite, tribasic potassium phosphate, dibasic potassium phosphate, calcium hydroxide, magnesium hydroxide, calcium carbonate, sodium citrate, sodium succinate, sodium propionate and sodium fumarate are preferred; and magnesium hydroxide and sodium thiosulfate are most preferred. The amount of the alkaline material employed may be in the range of about 0.01 part to about 10 parts by weight, preferably about 0.1 part to about 2 parts per 100 parts of the metal powder.

The term "water content" in the specification and the claims means content of free water, and excludes content of water of crystallization. The oxygen absorbent of this invention has less than 1% of free water on the basis of the total weight of the absorbent, preferably less than 0.5% by weight of water, and more preferably less than 0.2% by weight of water.

The oxygen absorbent of this invention is prepared in the following way:

The metal powder is mixed with a solution of the metal halide and optionally the binder and/or the alkaline material, thereby coating the metal halide and optionally the binder and/or the alkaline material on the surface of the metal powder; and the resulting coating is dried until the water content thereof amounts to less than 1% by weight based on the total weight of the absorbent.

The solution of the metal halide may be a conventional aqueous solution thereof. The metal halide may be dissolved in mixture of water and other solvent. The halide concentration may be suitably selected from any concentration up to saturated concentration.

The metal powder is mixed with the solution of the metal halide until the halide is coated on the powder particle.

When the metal powder is coated with the metal halide as well as the binder and/or the alkaline material, the order of the coating is not critical. The metal powder may be coated with these materials simultaneously or successively. The mixing process and the coating process are not critical. Conveniently, the mixture of the metal powder and the solution of the metal halide and other component may be dried as it is, or after the mixture is filtered, the precipitate may be dried.

Preferably the metal powder is mixed with the solution of the metal halide and optionally the binder and/or the alkaline material containing a minor amount of water; and the resulting mixture is dried as it is. The coating is dried until the water content amounts to less than 1%, preferably less than 0.5%, more preferably less than 0.2% and most preferably is substantially zero. When the water content is more than 1%, the resulting absorbent has poor flowability, it is difficult to pack the absorbent, it penetrates through the packaging material and the amount of hydrogen evolved becomes more.

The drying process is not critical. For example, the coating may be dried under an inert gas atmosphere, one atmospheric pressure or a reduced pressure. In order to shorten the drying time, the metal halide, and optionally the binder and/or the alkaline material are dissolved in the mixture of water and a hydrophilic solvent, such as an alcohol.

The oxygen obsorbent of this invention can be employed under moisture-rich atmosphere, preferably under an atmosphere having a relative humidity of more than 50%. Therefore, it can be profitably employed in a sealed container in which water-containing foodstuffs are packed. In case of packing foodstuffs containing little or no water, the absorbent can be profitably employed with water-containing materials or compounds having water of hydration or crystallization. Also, it can be employed with materials generating water in the packaging system.

The oxygen absorbent of this invention is powder, and the powder absorbent may be employed as it is. Since the moldability of the absorbent is good, the absorbent powder can be tableted by tableting machine. The resulting tablet has good hardness and has the absorbing ability of oxygen as the absorbent powder does.

Since the oxygen absorbent of this invention is prepared by coating the metal halide on the surface of the metal powder, the metal powder and the metal halide contact each other very effectively. Therefore, although the amount of the halide employed is small, the absorbing ability of oxygen is large. Since the amount of the halide employed is small, the absorbent of this invention becomes neither wet nor pasty and, it does not remove a large amount of water from the foodstuff, whereby the degradation of the foodstuff is prevented, and the absorbent neither penetrates into the packaging material nor contaminates the foodstuffs.

Since the oxygen absorbent of this invention has a low water content, it does not absorb oxygen at all even when it is allowed to stand in air. Handling of the absorbent is easy, and little hydrogen is generated in storage or during use of the absorbent.

Only when the oxygen absorbent of this invention is sealed with water-containing foodstuff in a container, it exhibits the absorbing ability of oxygen. Oxygen absorbents having a variety of absorbing properties can be obtained by varying its components and its proportion.

The oxygen absorbent of this invention is practical and has excellent properties.

The present invention is further illustrated by the following Examples and Comparative Examples. However, this invention should not be limited by these examples and comparative examples. The percent and parts in the Examples are based on weight unless otherwise specified.

EXAMPLE 1

To 100 gr of Fe powder was added 2 ml. of a 20% aqueous solution of each of the metal halides as given in Table 1, and each of the resulting mixtures was mixed sufficiently and was dried at 40° C. under reduced pressure of 40 mm Hg until its water content amounted substantially to zero. A variety of metal halide-coated metal powders were obtained. Each of the resulting powders in the amount as given in Table 1 was placed in a perforated polyethylene film-laminated paper bag. The bag and sanitary cotton impregnated with 10 ml. of water were placed in a 1l. sealed container so as not to contact the cotton with the bag. The amount of oxygen absorbed was measured at 25° C. periodically. The results are shown in Table 1.

Table 1

| Run No. | Components of oxygen absorbent | | | Change in amount of oxygen absorbed with time (ml.) | | |
|---|---|---|---|---|---|---|
| | Fe powder (gr) | metal halide kinds | mg | after 20 hrs | after 40 hrs | after 80 hrs |
| 1 | 1 | NaCl | 4 | 45 | 133 | 155 |
| 2 | 1 | NaBr | 4 | 70 | 107 | 145 |
| 3 | 1 | KI | 4 | 64 | 99 | 116 |
| 4 | 1 | CaCl$_2$ | 4 | 64 | 114 | 158 |
| 5 | 1 | KCl | 4 | 45 | 132 | 153 |
| 6 | 1 | MgCl$_2$ | 4 | 62 | 112 | 156 |

Evolution of a little hydrogen was detected. The hydrogen evolution after 80 hours is given in Table 2.

Table 2

| Run No. | Hydrogen concentration in the sealed container after 80 hours passed (%) |
|---|---|
| 1 | 0.003 |
| 2 | 0.002 |
| 3 | 0.004 |
| 4 | 0.005 |
| 5 | 0.002 |
| 6 | 0.004 |

Stain on the paper due to the penetration of the absorbent into the paper bag was not detected.

COMPARATIVE EXAMPLE 1

One gram of Fe powder was mixed with 4 mg of NaCl powder. The resulting powdery mixture was placed in a perforated polyethylene-film-laminated paper bag. The bag and sanitary cotton impregnated with 10 ml. of water in a 1l. sealed container so as not to contact the cotton with the bag. The amount of oxygen absorbed was measured at 25° C. periodically. The results are shown in Table 3.

Table 3

| Number of hours passed | 20 | 40 | 80 |
|---|---|---|---|
| Amount of oxygen absorbed (ml) | 1 | 1 | 2 |

The compound absorbed little oxygen.

COMPARATIVE EXAMPLE 2

One gram of Fe powder, 4 mg of NaCl powder and 0.2 ml. of H$_2$O were mixed. The resulting mixture was placed in a perforated polyethylene film-laminated paper bag. The bag was placed in a 1l. sealed container. The amount of oxygen absorbed was measured at 25° C. periodically. The results are shown in Table 4.

Table 4

| Number of hours passed | 20 | 40 | 80 |
|---|---|---|---|
| Amount of oxygen absorbed (ml) | 6 | 10 | 17 |

The amount of oxygen absorbed of the compound employed in Comparative Example 2 was less than that of the absorbent of Example 1. The concentration of hydrogen evoluted in the sealed container was 0.32% after 80 hours passed.

COMPARATIVE EXAMPLE 3

The procedure of Comparative Example 2 was repeated except that the amount of NaCl was 1 gr in place of 4 mg. The results are shown in Table 5.

Table 5

| Number of hours passed | 20 | 40 | 80 |
|---|---|---|---|
| Amount of oxygen absorbed (ml) | 74 | 112 | 155 |

The concentration of hydrogen evoluted in the sealed container was 2.3% after 80 hours passed. The value was more than that in Example 1.

COMPARATIVE EXAMPLE 4

One gram of Fe powder, 1 gram of NaCl powder and 0.2 ml. of H$_2$O were mixed, and the resulting powdery mixture was placed in a perforated polyethylene film-laminated paper bag. The bag and sanitary cotton imprenated with 10 ml. of water were placed in a 1l. sealed container so as not to contact the cotton with the bag.

The absorbing ability of oxygen was measured at 25° C. periodically. The results are shown in Table 6.

Table 6

| Number of hours passed | 20 | 40 | 80 |
|---|---|---|---|
| Amount of oxygen absorbed (ml) | 63 | 98 | 154 |

The concentration of hydrogen evolved in the sealed container was 3.1%. The amount was much. Stain on the paper not due to the penetration of the compound into the paper was detected two days after the compound was set to absorb oxygen. Black stain on the all portion of paper in contact with the powder was detected in four days.

EXAMPLE 2

0.4 gr of NaCl powder, 0.4 gr of each of the binders as given in Table 7 and 40 ml. of water were mixed. To the mixture was added 100 gr. of Fe powder. The resulting mixture was mixed sufficiently and was dried at 80° C. under reduced pressure of 10 mm Hg until its water content amounted substantially to zero. Each of the metal halide-coated metal powders were obtained. Each of the resulting powders in the amount as given in Table 7 was placed in a perforated polyethylene film-laminated paper bag. The bag and sanitary cotton impregnated with 10 ml. of water were placed in a 2l. sealed contained so as not to contact the bag with the cotton. The absorbing amount of oxygen was measured at 25° C. periodically. The results are shown in Table 7.

Table 7

| Run No. | Components of absorbent and its proportion | | | | Change in amount of oxygen absorbed with time (ml.) | | |
|---|---|---|---|---|---|---|---|
| | Fe powder (g) | NaCl (mg) | Binder Kind | mg | after 20 hrs | after 40 hrs | after 80 hrs |
| 1 | 1 | 4 | sodium | 2 | 136 | 192 | 238 |
| 2 | 1 | 4 | starch | 2 | 128 | 185 | 236 |
| 3 | 1 | 4 | CMC | 2 | 109 | 166 | 230 |
| 4 | 1 | 4 | PVA | 2 | 107 | 176 | 232 |

The concentration of hydrogen evolved in the sealed container after 80 hours was given in Table 8.

Table 8

| Run No. | Hydrogen concentration in the sealed container after 80 hours passed (%) |
|---|---|
| 1 | 0.0002 |
| 2 | 0.0004 |
| 3 | 0.0002 |
| 4 | 0.0003 |

It is apparent from Table 8 that little generation of hydrogen was detected. Also stain on the paper was not detected.

EXAMPLE 3

To 1 gr of Fe powder was added a various amounts of a 10% aqueous solution of NaCl. The resulting mixture was mixed sufficiently, and dried at 60° C. reduced pressure of 60 mm Hg until its water content amounted substantially to zero. Each of the NaCl-coated Fe powders was obtained as given in Table 9. Each of the resulting powders was placed in a preforated polyethylene film-laminated paper bag. The bag and sanitary cotton impregnated water 10 ml. of water were placed in a 500 ml. sealed container. The container was left to stand at 25° C. The oxygen concentration in the container was measured after 30 hours. As a result, the concentrations all were 0% as shown in Table 9.

Table 9

| No. | NaCl conc. | $O_2$ conc. after 30 hrs |
|---|---|---|
| 1 | 1 mg | 0% |
| 2 | 5 | 0 |
| 3 | 10 | 0 |

EXAMPLE 4

To 100 gr of Fe powder was added 50 ml. of a 1% aqueous solution of NaCl, and the resulting mixture was mixed sufficiently and dried at 50° C. under reduced pressure of 20 mm Hg until its water content amounted substantially to zero. The NaCl (0.5 parts)-coated Fe powder (100 parts) was obtained. Two grams of the resulting powder was placed in a perforated polyethylene film-laminated paper bag. The bag and bread were placed in a 500 ml. sealed container. The container was left to stand at 25° C. The oxygen concentration in the container was measured periodically. Results are shown in Table 10.

Table 10

| Number of hours passed | 10 hrs | 20 hrs | 30 hrs | 30 days |
|---|---|---|---|---|
| Oxygen concentration % | 12.4 | 3.9 | 0 | 0 |

As a control, only bread was left to stand in a sealed container at 25° C. without applying any oxygen absorbent thereto.

Growing of mold and taste of bread by organoleptic test were observed in Example 4 and control. The taste was evaluated by the following five ratings:

| Ratings | | | | |
|---|---|---|---|---|
| 5 | 4 | 3 | 2 | 1 |
| savory ←→ unsavory | | | | putrefaction |

Whether the test bread gets moldy was evaluated by the following four degree scale.

| Ratings | |
|---|---|
| — | No mildew grew |
| + | Slight mildew grew |
| ++ | Mildew grew to a considerable extent |
| +++ | A great amount of mildew grew |

Table 11

| Number of days passed | Example (oxygen absorbent was used) | | Control (no oxygen absorbent was used) | |
|---|---|---|---|---|
| | mold | taste | mold | taste |
| 4 | — | 5 | — | 3 |
| 8 | — | 5 | + | 1 sour odor |
| 12 | — | 4 | ++ | 1 putrefactive odor |
| 30 | — | 3 | +++ | 1 putrefactive odor |

EXAMPLE 5

To one hundred gr of Fe powder was added 50 ml. of a 0.2% aqueous solution of $CaCl_2$, and the resulting mixture was mixed sufficiently and dried at 40° C. under reduced pressure of 40 mm Hg until its water content amounted substantially to zero. The $CaCl_2$ (0.1 part)-coated Fe powder (100 parts) was obtained. The resulting powder was placed in a perforated polyethylene film-laminated paper bag. The bag and each of the following foodstuffs were placed in a 500 ml. sealed container and left to stand for testing the preservation of the foodstuff. Only one of each of the foodstuffs was lefted to stand in the sealed container as control test.

Growing of mold on the foodstuffs and taste thereof were tested as in Example 4.

Sponge cake (Preservating temperature was 25° C.).

Table 12

| Number of days passed | Example 5 (oxygen absorbent was used) | | Control (no oxygen absorbent was used) | |
|---|---|---|---|---|
| | mold | taste | mold | taste |
| 4 | — | 5 | — | 3 |
| 8 | — | 5 | — | 2 |
| 12 | — | 5 | + | 1 |
| 30 | — | 5 | +++ | putrefaction |

Table 13

| | Strawberries (presenting temperature was 5° C) | |
|---|---|---|
| Preservation days | Example 5 (oxygen absorbent was used) | Control (no oxygen absorbent was used) |
| | taste | taste |
| first day | 5 | 5 |
| second day | 5 | 3 |
| third day | 4 | 1 |
| fourth day | 4 | 1 |

Table 14

| | Sweet broiled chestnuts (25° C) | | | |
|---|---|---|---|---|
| preservation days | Example 5 (oxygen absorbent was used) | | Control (no oxygen absorbent was used) | |
| | mold | taste | mold | taste |
| 1st day | — | 5 | — | 5 |
| 5th day | — | 5 | — | 2 |
| 10th day | — | 4 | ± | 2 |
| 15th day | — | 4 | + | 1 |
| 20th day | — | 4 | ++ | 1 |

EXAMPLE 6

To 100 gr of each of metal powder was added 2 ml. of a 20% aqueous solution of NaCl, and the resulting mixture was mixed sufficiently and dried at 40° C. under reduced pressure of 40 mm Hg until its water content amounted substantially to zero. The NaCl (0.4 parts)-coated metal powders (100 parts) were obtained. The absorbing ability of oxygen was measured by using the resulting powders as in Example 1. The results are shown in Table 15.

Table 15

| Components and proportion of oxygen absorbent | | | Change in amount of oxygen absorbed with time (ml) | | |
|---|---|---|---|---|---|
| kinds of metal powders | g | NaCl (mg) | after 30 hrs | after 40 hrs | after 80 hrs |
| Fe | 1 | 4 | 45 | 133 | 155 |
| Cu | 1 | 4 | 6 | 13 | 28 |
| Zn | 1 | 4 | 32 | 53 | 78 |

EXAMPLE 7

In 100 ml. of water were dissolved 0.6 gr of NaCl and 0.1 gr of each of the alkaline materials as given in Table 15. To the resulting solution was added 100 gr of Fe powder. The resulting mixture was mixed with stirring. The mixture was heated to 100° C. in a nitrogen atmosphere to dry the mixture until its water content amounted substantially to zero.

One gram of each of the resulting metal halide (0.6 parts) and alkaline material (0.1 part)-coated metal powder (100 parts) was placed in a perforated polyethylene film-laminated paper bag. The bag and sanitary cotton impregnated with 10 ml. of water were placed in a 1l. sealed container so as not to contact the bag with the cotton. The container was left to stand at 25° C. The oxygen concentration after 30 hours and the hydrogen concentration after 80 hours were measured. The results are shown in Table 16.

Table 16

| Alkaline materials | Oxygen concentration after 30 hrs (%) | Hydrogen concentration after 80 hrs (%) |
|---|---|---|
| NaOH | 0.1 | 0.0001 |
| $Na_2SO_3$ | 0.0 | 0.0002 |
| $Na_2CO_3$ | 0.1 | 0.0001 |
| KOH | 0.0 | 0.0002 |
| $Ca(OH)_2$ | 0.0 | 0.0001 |
| $Mg(OH)_2$ | 0.0 | 0.0001 |
| $Na_2S_2O_3$ | 0.0 | 0.0001 |

EXAMPLE 8

In 50 ml. of water were dissolved 2 gr of NaCl and 0.5 gr of KOH. To the aqueous solution was added 100 gr of Fe powder. The resulting mixture was mixed with stirring. The powder was filtered by Nutsche to obtain cake. The cake was dried at 60° C. under reduced pressure of 20 mm Hg until its water content amounted substantially to zero. The amounts of NaCl and KOH adhering to the surface of the Fe powder was 0.37% and 0.093%, respectively.

The resulting metal halide-coated metal powder was placed in a perforated polyethylene film-laminated paper bag. The bag and sanitary cotton impregnated with 10 ml. of water were placed in a 1l. sealed container so as not to contact the bag with the cotton. The container was left to stand at 25° C. After 30 hours passed, the oxygen concentration was 0.0%. After 80 hours passed, the hydrogen concentration was 0.0003%.

EXAMPLE 9

In 40 ml. of $H_2O$ were dissolved 0.4 gr of NaCl, 0.2 gr of NaOH and 0.4 gr of sodium alginate. To the resulting aqueous solution was added 100 gr of Fe powder with stirring. The resulting mixture was dried at 80° C. under reduced pressure of 40 mm Hg until its water content amounted substantially to zero. One gram of the resulting NaCl-coated metal powder was placed in a perforated polyethylene film-laminated paper bag. The bag and sanitary cotton impregnated with 10 ml. of water were placed in a 1l. sealed container so as not to contact the bag with the cotton. The container was left to stand at 25° C. After 30 hours passed, the oxygen concentration was 0.0%. After 80 hours passed, the hydrogen concentration was 0.0000%.

EXAMPLE 10

To 100 gr of Fe powder was added each of the aqueous solutions of NaCl as given in Table 16. After the resulting mixture was mixed, it was dried at 80° C. under reduced pressure of 20 mm Hg until its water content amounted to substantially to zero. One gram of each of the resulting NaCl-coated Fe powder as given in Table 17 was placed in a perforated polyethylene film-laminated paper bag. The bag and sanitary cotton impregnated with 10 ml. of water were placed in a 1l. sealed container so as not to contact the bag with the cotton. The container was lefted to stand at 25° C. The amount of oxygen absorbed was measured periodically. After 80 hours passed, the hydrogen concentration was also measured. The results are shown in Table 17.

Table 17

| Run No. | Concentration of NaCl solution and amount of solution added | | change in amount of $O_2$ absorbed with time (hrs) | | | $H_2$ concentration after 80 hours passed |
|---|---|---|---|---|---|---|
| | | | 20 | 40 | 80 | |
| 1 | 0.1% NaCl | 10ml | 22 | 61 | 101 | 0.001 |
| 2 | 1% NaCl | 10ml | 35 | 92 | 142 | 0.002 |
| 3 | 20% NaCl | 5ml | 58 | 130 | 153 | 0.003 |
| 4 | 20% NaCl | 25ml | 62 | 126 | 149 | 0.005 |

EXAMPLE 11

To 10l. of water was dissolved 0.5 Kg of KCl. To the solution was added 100.0 Kg of Fe powder with stirring. The solution was dried with stirring at 40° C. under reduced pressure of 40 mm Hg when the weight of the solution amounted to 101.0 Kg, the vacuum drying was discontinued. The free flowable KCl (0.5 parts)-coated Fe powder (100 parts) was obtained. One gram of the powder was placed in a perforated polyethylene film-laminated paper bag. The bag and sanitary cotton impregnated with 10 ml. of water were placed in a 1l. sealed container so as not to contact the bag with the cotton. The container was left to stand at 25° C. The amount of oxygen absorbed and the amount of $H_2$ generated was measured periodically. The results are shown in Table 18.

Table 18

| Number of hours passed | 20 | 40 | 80 |
|---|---|---|---|
| Amount of $O_2$ absorbed (ml) | 46 | 135 | 157 |
| Amount of $H_2$ generated | — | — | 0.006% |

2g Each of the powder could be distributed in said paper bag by automatic filling machine within the tolerance of ± 0.1 gr.

EXAMPLE 12

One gram of the powder obtained in Example 11 was placed in a perforated polyethylene film-laminated paper bag. The bag was left to stand for 6 months in a room maintained at a relative humidity of 50–60%. Thereafter, the bag and sanitary cotton impregnated with 10 ml. of water were placed in a 1l. sealed container so as not to contact the bag with the cotton. The amount of oxygen absorbed was measured at 25° C. periodically. The results are shown in Table 19.

Table 19

| Number of hours passed | 20 | 40 | 80 |
|---|---|---|---|
| Amount of oxygen absorbed (ml) | 43 | 134 | 161 |

The concentration of hydrogen generated after 80 hours was 0.006%.

COMPARATIVE EXAMPLE 5

To 100 gr of Fe powder was added 125 ml. of a 20% aqueous solution of NaCl, and the resulting mixture was mixed sufficiently and dried at 40° C. under reduced pressure of 40 mm Hg until its water content amounted substantially to zero. 1.25 gr of the powder was placed in a perforated polyethylene film-laminated paper bag. The bag and sanitary cotton impregnated with 10 ml. of water was placed in a 1l. sealed container so as not to contact the bag with the cotton. The amount of oxygen absorbed was measured at 25° C. periodically. The results are shown in Table 20.

Table 20

| Number of hours passed | 20 | 40 | 80 |
|---|---|---|---|
| Amount of oxygen absorbed (ml) | 18 | 32 | 45 |

The amount of oxygen absorbed was lowered in comparison with Example 1.

The resulting powder consisted of the NaCl-coated Fe powder and white NaCl crystal, and had poor flowability. Since the powder is deliquescent, it was impossible to fill paper bags with the powder automatically by automatic filling machine.

COMPARATIVE EXAMPLE 6

To 100.0 Kg of Fe powder was added 2.0 Kg of a 20 aqueous solution of NaCl, and the resulting mixture was mixed sufficiently and dried at 40° C. under reduced pressure of 40 mm Hg. When the weight of the mixture amounted to 102.5 kg, the vacuum drying was discontinued. Since the resulting composition contained 2% of water, it had poor flowability. When attempts were made to automatically fill paper bags with the powder by automatic filling machine, it was not possible to do so, because it clogged into the measuring parts of the machine. One gram of the powder was placed in a perforated polyethylene film-laminated paper bag. The bag and sanitary cotton impregnated with 10 ml. of water were placed in a 1l. sealed container. The amount of oxygen absorbed was measured at 25° C. periodically. The results are shown in Table 21.

Table 21

| Number of hours passed | 20 | 40 | 80 |
|---|---|---|---|
| Amount of oxygen absorbed (ml) | 26 | 43 | 65 |

The values were less than those in Example 1.

What is claimed is:

1. An oxygen absorbent in which at least one metal halide is coated on the surface of at least one metal powder, the amount of metal halide coated being in the range of from about 0.001 to about 10 parts by weight per 100 parts by weight of the metal powder, the water content of the absorbent being less than 1% by weight based on the basis of total weight of the absorbent.

2. The oxygen absorbent as defined in claim 1 wherein the metal powder is selected from the group consisting of iron powder, zinc powder, copper powder and mixture thereof.

3. The oxygen absorbent as defined in claim 2 wherein the metal powder is iron powder.

4. The oxygen absorbent as defined in claim 1 wherein the metal constituting the metal halide is selected from lithium, sodium, potassium, magnesium, calcium and barium.

5. The oxygen absorbent as defined in claim 1 wherein the halide constituting the metal halide is selected from the group consisting of chloride, bromide and iodide.

6. The oxygen absorbent as defined in claim 5 wherein the halide is chloride.

7. The oxygen absorbent as defined in claim 1 wherein the amount of the metal halide coated is in the range of from about 0.01 to about 5 parts by weight per 100 parts by weight of the metal powder.

8. The oxygen absorbent as defined in claim 1 wherein the water content is less than 0.5% by weight on the basis of total weight of the absorbent.

9. The oxygen absorbent as defined in claim 1 wherein the water content is less than 0.2% by weight on the basis of total weight of the absorbent.

10. An oxygen absorbent in which at least one metal halide and at least one binder and/or at least one alkaline material are coated on the surface of at least one metal powder, the amount of the metal halide coated being in the range of from about 0.001 to about 10 parts by weight per 100 parts by weight of the metal powder, the water content of the absorbent being less than 1% by weight on the basis of total weight of the absorbent.

11. The oxygen absorbent as defined in claim 10 wherein the metal powder is selected from the group consisting of iron powder, zinc powder, copper powder and mixture thereof.

12. The oxygen absorbent as defined in claim 11 wherein the metal powder is iron powder.

13. The oxygen absorbent as defined in claim 10 wherein the metal constituting the metal halide is selected from lithium, sodium, potassium, magnesium, calcium and barium.

14. The oxygen absorbent as defined in claim 10 wherein the halide constituting the metal halide is selected from the group consisting of chloride, bromide and iodide.

15. The oxygen absorbent as defined in claim 14 wherein the halide is chloride.

16. The oxygen absorbent as defined in claim 10 wherein the amount of the metal halide coated is in the range of from about 0.01 to about 5 parts by weight per 100 parts by weight of the metal powder.

17. The oxygen absorbent as defined in claim 10 wherein the water content is less than 0.5% by weight on the basis of total weight of the absorbent.

18. The oxygen absorbent as defined in claim 10 wherein the water content is less than 0.2% by weight on the basis of total weight of the absorbent.

19. The oxygen absorbent as defined in claim 10 wherein the binder is water soluble polymer.

20. The oxygen absorbent as defined in claim 19 wherein the water soluble polymer is selected from the group consisting of sodium alginate, carboxymethyl cellulose, hydroxymethyl cellulose, methyl cellulose, ethyl cellulose, propyl cellulose, sodium carboxymethyl cellulose, starch, polyhydric alcohols, polyvinyl alcohol, saccharides and tragacanth gum.

21. The oxygen absorbent as defined in claim 10 wherein the amount of the binder coated is in the range of from about 0.01 part to about 10 parts by weight per 100 parts by weight of the metal powder.

22. The oxygen absorbent as defined in claim 10 wherein the alkaline material is selected from the group consisting of hydroxides, carbonates, sulfites, thiosulfates, dibasic phosphates, tribasic phosphates, polyphosphates, tripolyphosphates and organic acid salts of alkali metals or alkali earth metals.

23. The oxygen absorbent as defined in claim 10 wherein the alkaline material is magnesium hydroxide.

24. The oxygen absorbent as defined in claim 10 wherein the alkaline material is sodium thiosulfate.

25. The oxygen absorbent as defined in claim 10 wherein the amount of the alkaline material coated is in the range of from about 0.01 part to about 10 parts by weight per 100 parts by weight of the metal powder.

26. The oxygen absorbent as defined in claim 10 wherein the amount of the alkaline material coated is in the range of from about 0.1 part to about 2 parts by weight per 100 parts by weight of the metal powder.

27. A process for producing an oxygen absorbent, characterized by mixing at least one metal powder with a solution of at least one metal halide to coat metal halide on the surface of the metal powder, the amount of the metal halide coated being in the range of from about 0.001 part to about 10 parts by weight per 100 parts by weight of the metal powder, and then drying the coating until its water content amounts to less than 1% by weight on the basis of total weight of the absorbent.

28. The process as defined in claim 27 wherein the metal powder is selected from the group consisting of iron powder, zinc powder, copper powder and mixture thereof.

29. The process as defined in claim 28 wherein the metal powder is iron powder.

30. The process as defined in claim 27 wherein the metal constituting the metal halide is selected from lithium, sodium, potassium, magnesium, calcium and barium.

31. The process as defined in claim 27 wherein the halide constituting the metal halide is selected from the group consisting of chloride, bromide and iodide.

32. The process as defined in claim 31 wherein the halide is chloride.

33. The process as defined in claim 27 wherein the amount of the metal halide coated is in the range of from about 0.01 to about 5 parts by weight per 100 parts by weight of the metal powder.

34. The process as defined in claim 27 wherein the solution of the metal halide is aqueous solution.

35. The process as defined in claim 27 wherein the water content is less than 0.5% by weight on the basis of total weight of the absorbent.

36. The process as defined in claim 27 wherein the water content is less than 0.2% by weight on the basis of total weight of the absorbent.

37. A process for producing an oxygen absorbent, characterized by mixing at least one metal powder with at least one metal halide solution and at least binder and/or at least one alkaline material to coat the metal halide and the binder and/or the alkaline material on the surface of the metal powder, the amount of the metal halide coated being in the range of from about 0.001 part to about 10 parts by weight per 100 parts by weight of the metal powder, and then drying the coating until its water content amounts to less than 1% by weight on the basis of total weight of the absorbent.

38. The process as defined in claim 37 wherein the metal powder is selected from the group consisting of iron powder, zinc powder, copper powder and mixture thereof.

39. The process as defined in claim 38 wherein the metal powder is iron powder.

40. The process as defined in claim 37 wherein the metal constituting the metal halide is selected from lithium, sodium, potassium, magnesium, calcium and barium.

41. The process as defined in claim 37 wherein the halide constituting the metal halide is selected from the group consisting of chloride, bromide and iodide.

42. The process as defined in claim 41 wherein the halide is chloride.

43. The process as defined in claim 37 wherein the amount of the metal halide coated is in the range of from about 0.01 to about 5 parts by weight per 100 parts by weight of the metal powder.

44. The process as defined in claim 37 wherein the metal halide solution is aqueous solution.

45. The process as defined in claim 37 wherein the water content is less than 0.5% by weight on the basis of total weight of the absorbent.

46. The process as defined in claim 37 wherein the water content is less than 0.2% by weight on the basis of total weight of the absorbent.

47. The process as defined in claim 37 wherein the binder is water soluble polymer.

48. The process as defined in claim 37 wherein the water soluble polymer is selected from the group consisting of sodium alginate, carboxymethyl cellulose, hydroxymethyl cellulose, methyl cellulose, ethyl cellulose, propyl cellulose, sodium carboxymethyl cellulose, starch, polyhydric alcohols, polyvinyl alcohol, saccharides and tragacanth gum.

49. The process as defined in claim 37 wherein the amount of the binder coated is in the range of from about 0.01 part to about 10 parts by weight per 100 parts by weight of the metal powder.

50. The process as defined in claim 37 wherein the alkaline material is selected from the group consisting of hydroxides, carbonates, sulfites thiosulfates, dibasic phosphates, tribasic phosphates, polyphosphates, tri-polyphosphates or organic acid salts of alkali metals or alkali earth metals.

51. The process as defined in claim 37 wherein the alkaline material is magnesium hydroxide.

52. The process as defined in claim 37 wherein the alkaline material is sodium thiosulfate.

53. The process as defined in claim 37 wherein the amount of the alkaline material coated is in the range of from about 0.01 part to about 10 parts by weight per 100 parts by weight of the metal powder.

54. The process as defined in claim 37 wherein the amount of the alkaline material coated is in the range of from about 0.1 part to about 2 parts by weight per 100 parts by weight of the metal powder.

* * * * *